United States Patent [19]
Aillet

[11] 3,941,929
[45] Mar. 2, 1976

[54] TRANSCODER FOR DIGITAL DIFFERENTIAL PHASE MODULATION

[75] Inventor: Claude Aillet, Lannion, France

[73] Assignee: Compagnie Industrielle des Telecommunications Cit-Alcatel, France

[22] Filed: July 15, 1974

[21] Appl. No.: 488,657

[30] Foreign Application Priority Data
July 13, 1973   France .............................. 73.25850

[52] U.S. Cl. ............................ 178/67; 340/347 DD
[51] Int. Cl.² ....................................... H04L 27/24
[58] Field of Search ................. 178/67, 66 R, 66 A; 325/30, 145, 320, 45; 332/16 R, 21; 307/26 Z; 328/155; 340/347 DD

[56] References Cited
UNITED STATES PATENTS
3,784,914   1/1974   Aillet ............................... 178/67 X Primary Examiner—Benedict V. Safourek
Assistant Examiner—Robert Hearn
Attorney, Agent, or Firm—Craig & Antonelli

[57] ABSTRACT

Transcoder for digital differential phase modulation designed for accumulating, separately, partial trains of pulses which are mutually shifted and whose rhythm is an integral fraction of that of the original train. The partial accumulations are finally gathered together in a common adder. The invention enables a differential modulation on adjacent bits at a speed which is not limited by the accumulation loop delay.

6 Claims, 2 Drawing Figures

TRANSCODER FOR DIGITAL DIFFERENTIAL PHASE MODULATION

The invention concerns the branch of digital transmission by differential phase modulation.

In a differential phase modulation, what is combined with the modulation signal is not a given phase state, but a given phase jump. Moreover, to produce a differential phase modulation, it is necessary to use a transcoder which, receiving the modulation signals, supplies suitable signals to the modulators to produce the required differential modulation.

In order to fulfill its function, a transcoder must have a memory which gives the state of the phase modulator energizing signals at a given instant, so as to determine their new values at the following instant as a function of the contents of the modulation signals. The states of the output signals of the transcoder depend on their preceding states and on the contents of the modulation. For a two-phase differential modulation, if A is the digital input train and $\alpha$ is the digital output train of the transcoder with a modulation law for example such as for $\alpha = 0$, $\Phi = 0°$ and $\alpha = 1$, $\Phi = 180°$, the transcoder will carry out the operation $\alpha [(n-1) T] = f [A(n T), \alpha (n T)]$ where T represents the bit period, so as to keep to the truth table, for example :

| n t | (n + 1) T |
|---|---|
| A = 1 $\alpha$ | $\overline{\alpha}$ |
| A = 0 $\alpha$ | $\alpha$ |

The operation $f (A, \alpha)$ requires a certain time $\tau$ which defines the maximum operation speed. Indeed, the transcoder requires a certain time to establish the new value of $\alpha$ on a basis of its preceding value and of the value of the signal A. Before a new value of the modulation signal A appears, the value of $\alpha$ must be well established.

In the preceding case, the differential phase modulation bore on two adjacent bit periods. It is also possible, as described in the periodical Radio Engineering, Vol. 24, N° 9, 1969, p. 70 to 74, to make the data bear, on a phase jump between two non-adjacent bit periods, for example separated by one bit period; in the latter case, the transcoder has available the duration of two bit periods for calculating the output signal on a basis of its value two bit moments before. For a given delay, in that case, the operation speed is doubled.

In the differential phase demodulation, to extract the data, the phase of the high-frequency modulated signal must be compared at a given instant with the phase of that same signal two bit moments previously. For that purpose, the demodulator uses at least one delay line having a length substantially equal to 2 bit moments. That type of demodulation has the drawback of being much more sensitive to a variation in the frequency of the carrier signal and to a variation in the length of the delay line, whose function is, in order to ensure the best performance in error rates of the demodulator, to effect a precise timing of the phase of the carrier signal.

Multiphase modulators, in which the phase vector distinguishes between more than two positions, more particularly, between four positions or between eight positions respectively are known. Its position is therefore described in binary terms, by two or three bits respectively, which, as a whole, constitute a "word". Physically, such a modulator receives, respectively, two or three binary pulse trains, in general m trains, on distinct inputs. The corresponding transcoder which supplies these trains from m original pulse trains, comprises a modulo $2^m$ accumulator.

For reasons of security in transmission, it is preferred to attribute to two neighbouring positions of the vector, two combinations of the code which distinguish themselves only by a single binary element. Such a code, which is called a Gray code, is not, however, favourable to the adding, in an accumulator, where a natural binary code is preferred.

A natural-to-Gray code convertor is therefore often found in a transcoder for a differential modulator having a phase jump.

The invention concerns a transcoder connected with the digital differential phase modulation for $m$ input binary pulse trains, $m$ being 1 or 2 or 3...; this enables modulation on 2 adjacent bits without forasmuch limiting the binary speed by the loop delay $\tau$ of the accumulation.

The transcoder in an embodiment according to the invention is characterized in that it comprises $p + 1$ accumulators having $m$ inputs, $p$ being 1, 2, 3..., that it comprises, moreover, $m$ distributors each feeding in a cyclic manner an input of each accumulator and a modulo $2^m$ adder which receives the trains leaving all the accumulators.

In an alternative embodiment of the invention, the transcoder comprises only a single accumulator whose loop delay is comprised between $p$ bit moments T and $(p+1)$ bit moments T of the pulse trains, comprises, moreover, $p$ delay lines in series connected with each output of the accumulator whose delay duration is one bit step T for each, and a modulo $2^m$ adder which receives the trains leaving the accumulator and delay lines.

The common idea of the two possibilities of embodiment is to accumulate non-adjacent bits and to add subsequently the partial accumulations.

Thus, the final result is a modulation on adjacent bits, but the accumulation no longer limits the operation speed.

The simplest example is that of $p = 1$, this meaning that odd bits and even bits are classified alternately in a pulse train, that the even bits and the odd bits are distributed on two distinct accumulators and that the contents are, finally, added together. The parallel operation of two accumulators at a slower rate is the equivalent of an operation in series in a single accumulator whose loop delay is two bit moments, but whose rhythm is identical to that of the original train. Such a single accumulator supplies, at its output, alternately, the accumulation of the even bits and that of the odd bits and it is necessary simply to bring them together by means of adequate delay lines and of an adder.

The invention applies in the same way to a single pulse train ($m = 1$) as to several, but beyond $m = 4$, the security of the transmission seems, according to present knowledge, compromised.

It is possible, within the scope of the invention, to connect with or integrate in the accumulator and/or the adder, a code convertor.

The invention will be described hereinafter in greater detail with reference to two figures.

Figure 1:
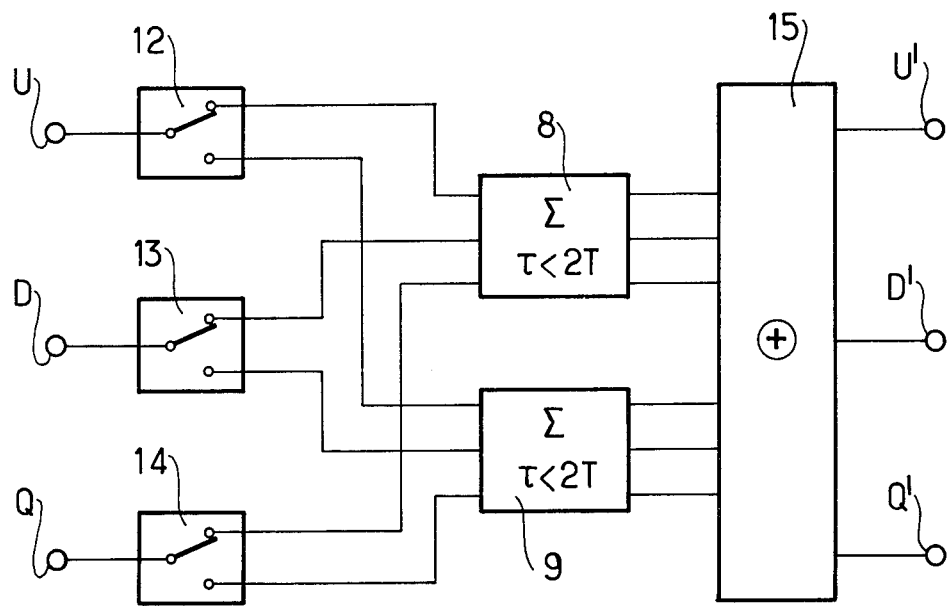
FIG. 1 shows diagrammatically a transcoder having two accumulators according to the invention.

The example of embodiment according to FIG. 1 concerns the case $m = 3$ and $p = 1$, that is, a transcoder having three binary input and output trains and two accumulators. It is possible to define the three binary elements (bits) which are applied simultaneously to the three trains as a "data word" one of whose bits constitutes the unit, the second bearing the valency 2 and the third bearing the valency 4. The bit period on the (well-synchronized) trains is called T. The 3 inputs are marked with U, D and Q, the three outputs of the transcoder bearing the references U', D', Q'.

According to the invention, this transcoder is provided with two accumulators 8 and 9, which effect a modulo $2^m$ accumulation of the words which reach them. Each new word is therefore added to the previous contents of the accumulator. The inputs of the accumulators are connected to the $p + 1$ outputs of $m$ distributors 12, 13 and 14 which divide up the pulses bit by bit and distribute them in a cyclic manner on the accumulators. Where $p = 1$, the positions of even bits and the positions of odd bits may be distinguished. All the bits in even positions are directed towards the accumulator 8 and all the odd bits are directed towards the accumulator 9. The words leaving the accumulators are added together in an adder 15 whose three outputs constitute the outputs U', D', Q' of the transcoder.

The operation of that transcoder is explained by means of the table I hereinafter, which shows, starting from a random basic state (the basic state does not influence the operation of a transcoder for differential modulation) the words displayed at the input U, D, Q, at the output of the accumulators 8 and 9 and at the output of the transcoder at the rate of one bit moment T per column. Between the displaying at the input and at the output of an accumulator, the loop delay $\tau$ is slighter than 2 T.

TABLE I

| Input | 000 101 001 011 111 101 010 100 110 000 000 000 |
|---|---|
| Accumulator 8 | 011 011 011 011 100 100 011 011 101 101 011 011 |
| Accumulator 9 | 101 101 101 010 010 101 101 010 010 110 110 110 |
| Output | 000 000 000 101 110 001 000 101 111 011 001 001 |

It will be observed, for example, that the input word 001 at the third column is accumulated in the accumulator 8 (previous state 011) to give at the fifth column 100 in an addition in natural modulo $2^3$ code. In each column, the outputs of the accumulators 8 and 9 are added by a modulo $2^3$ addition without delay. The following input word 011 (see fourth column) enters the accumulator 9 (see sixth column) and so on.

It will therefore be observed that by using distributors and two accumulators in parallel, a modulation on adjacent bits is obtained despite the loop delay greater than T.

Figure 2:
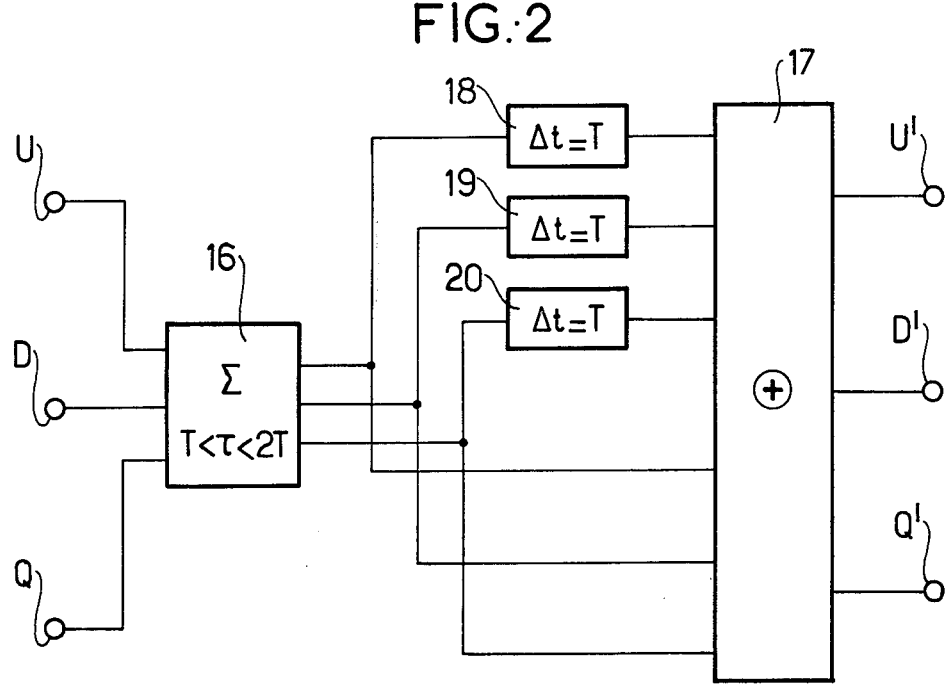
FIG. 2 shows a transcoder having a single accumulator according to the invention.

The alternative which is shown in FIG. 2 comprises a single accumulator 16 which may be identical to one of the accumulators according to FIG. 1 and which receives directly the input words on terminals U, D and Q at the original rate of 1/T.

The three outputs of that accumulator are directly connected to a word input of an adder 17 identical to that in FIG. 1. The second word input of that adder is fed through three delay lines 18, 19 and 20 having a delay of T, which each receive a pulse train leaving the accumulator.

The operation of that transcoder is identical to that according to FIG. 1 inasmuch as concerns the input and the output.

The accumulator nevertheless receives the bits at a rate higher than $1/\tau$ and therefore accumulates alternately the even words and odd words in series. To bring them together in the adder 17, use is made of the delay lines 18 to 20. The table II hereinbelow distinguishes itself from the preceding table only by the two rows in the middle whose contents are alternately reversed. For example, the input word 001 shown in the third column is added to the word 011 which is at the same instant at the output of the accumulator (second line of the table) to give, two periods later (see the fifth column), the word 100 at that output. The third line of the table indicates the same words behing the delay lines 18, 19 and 20, hence shifted by one column.

TABLE II

| Input | 000 101 001 011 111 101 010 100 110 000 000 000 |
|---|---|
| Accumulator 16 | 011 101 011 010 100 101 011 010 101 110 011 110 |
| Delay 1T | 101 011 101 011 010 100 101 011 010 101 110 011 |
| Output | 000 000 000 101 110 001 000 101 111 011 001 001 |

Inasmuch as concerns the technical embodiment of the transcoder according to the invention, use may be made of integrated logic circuits which may be acquired for a large range of speeds.

If the operation of the circuits is not synchronized by a general clock pulse, adjustable delay lines must, if need be, be provided to adapt the loop delay to a multiple of T.

The invention is not limited to the examples described hereinabove. It is possible, as has been stated hereinabove, to connect code convertors either with the accumulators or else with the adders. It is also possible to combine the two alternatives according to FIGS. 1 and 2 by substituting an accumulator in one of the figures by the transcoder assembly according to the other figure. By that combination, it is possible to adapt the system to any technical equipment whose binary rate is too high or whose loop delay is too long. Finally, it is possible to vary the values of $m$ and of $p$ and, more particularly, to choose $p = 2$, in which case three accumulators in parallel are provided or, in the variant according to FIG. 2, two delay lines of 1 bit moment, each in series in each output of the single storage accumulator are provided.

I claim:

1. Transcoder for digital differential phase modulation for m binary input pulse trains, m being an integer, characterized in that it comprises a plurality of accumulators each having m inputs, cyclic distributor means for feeding the consecutive pulses of each pulse train, in a cyclic manner, to a respective input of each accumulator in succession and adder means including a modulo $2^m$ adder for adding the contents of said accumulators.

2. Transcoder according to claim 1, characterized in that said adder means further includes binary code conversion means.

3. Transcoder according to claim 1, characterized in that binary code conversion means is connected to the inputs of said accumulators.

4. Transcoder for phase jump differential modulation for m input binary pulse trains, characterized in that it comprises an accumulator having a delay comprised between $p$ bit moments and $p + 1$ bit moments of the input pulse trains and being provided with m inputs and m outputs, $p$ being an integer, a plurality of delay lines, $p$ delay lines being connected in series to each respective output of the accumulator, each delay line having a delay duration of one bit moment, and a modulo $2^m$ adder having first inputs connected respectively to the output of a respective delay line and second inputs connected directly to respective outputs of said accumulator.

5. Transcoder according to claim 4, characterized in that said adder means further includes binary code conversion means.

6. Transcoder according to claim 4, characterized in that binary code conversion means is connected to said accumulator.

* * * * *